(12) United States Patent
Rose

(10) Patent No.: US 7,609,655 B2
(45) Date of Patent: Oct. 27, 2009

(54) FACILITATING TOPOLOGY CHANGE FUNCTIONALITY WHEN REGIONAL ROOT INFORMATION CHANGES

(75) Inventor: Laurence Rose, Oak Park, CA (US)

(73) Assignee: Alcatel Lucent, Paris (FR)

( * ) Notice: Subject to any disclaimer, the term of this patent is extended or adjusted under 35 U.S.C. 154(b) by 408 days.

(21) Appl. No.: 11/463,718

(22) Filed: Aug. 10, 2006

(65) Prior Publication Data
US 2007/0058571 A1     Mar. 15, 2007

Related U.S. Application Data

(60) Provisional application No. 60/707,513, filed on Aug. 11, 2005.

(51) Int. Cl.
*H04L 12/28* (2006.01)
*H04L 12/56* (2006.01)
(52) U.S. Cl. .................. 370/254; 370/256; 370/401
(58) Field of Classification Search ............... 370/254, 370/255, 256, 285, 401, 402, 408
See application file for complete search history.

(56) References Cited

U.S. PATENT DOCUMENTS 6,771,610 B1 *   8/2004   Seaman ............... 370/256
2001/0021177 A1 *   9/2001   Ishii ................. 370/256

* cited by examiner

*Primary Examiner*—Chirag Shah
*Assistant Examiner*—Ashley L Shivers
(74) *Attorney, Agent, or Firm*—RG & Associates LLC

(57) ABSTRACT

A method for providing Topology Change functionality in a Local Area Network (LAN) comprises a plurality of operations. An operation is performed for determining that a Multiple Spanning Tree Instance (MSTI) Master port on a Bridge of a LAN has transitioned to Forwarding state from a corresponding Common Internal Spanning Tree Instance (CSTI) Root port state and an operation is performed for transitioning a Port Transmit state machine of the Bridge from an Idle state to a Transmit state for enabling issuance of a Topology Change (TC) BPDU message from the MSTI Master port. The operation of transitioning the Port Transmit state machine is performed in response to performing the operation of determining that the Multiple Spanning Tree Instance (MSTI) Master port has transitioned to Forwarding state.

10 Claims, 2 Drawing Sheets

FACILITATING TOPOLOGY CHANGE FUNCTIONALITY WHEN REGIONAL ROOT INFORMATION CHANGES

CROSS REFERENCE TO RELATED APPLICATIONS

This patent application claims priority to co-pending U.S. Provisional Patent Application having Ser. No. 60/707,513, filed Aug. 11, 2005, entitled "802.1s MSTI Topology Change When Regional Root Information Changes", having a common applicant herewith and being incorporated herein in its entirety by reference.

FIELD OF THE DISCLOSURE

The disclosures made herein relate generally to implementation of Multiple Spanning Tree Protocol in a Local Area Network (LAN) and, more particularly, to facilitating 802.1s Multiple Spanning Tree Instance Topology Change when Regional Root information changes in a LAN.

BACKGROUND

Layer two (L2) devices of the Open Systems Interconnection (OSI) reference model are known as "bridges" or "switches" and are controlled by proprietary, standardized L2 (IEEE) and L3 (IETF) protocols. Multiple Spanning Tree Protocol (MSTP) is intended to provide full connectivity while preventing any undesirable loop for frames assigned to any given VLAN throughout a Bridged Local Area Network (LAN). Such a LAN includes arbitrarily interconnected Bridges, each operating a respective type or respective types of Spanning Tree Protocol. Examples of such types of spanning tree protocols include, but are not necessarily limited to, Spanning Tree Protocol (STP), Rapid Spanning Tree Protocol (RSTP) and Multiple Spanning Tree Protocol (MSTP). STP is a legacy protocol in accordance with the IEEE 802.1D 1998 standard. RSTP is in accordance with IEEE 802.1D 2004 standard. MSTP is in accordance with the IEEE 802.1Q 2005 standard.

Avoiding a loop is one of the most, if not the most, important tasks of a spanning tree protocol. Loop refers to a type of network issue in which data packets continue to be routed in an endless circle among Bridges rather than reaching their intended destinations. When a loop occurs, communication of information via an affected Bridge or Bridges quickly becomes very confusing and demanding of processing resources (e.g., central processing unit resources). MSTP is a Virtual Local Area Network (VLAN) aware implementation of spanning tree protocol, thus allowing frames assigned to different VLANs to follow separate paths. Each path is based on an independent Multiple Spanning Tree Instance (MSTI), within Multiple Spanning Tree (MST) regions composed of LANs and/or MST Bridges. These regions and constituent Bridges and/or LANs are connected into a single Common Spanning Tree (CST). The term "instance" refers to a physical tree without loop for a set of VLANs handled by a set of MSTP state machines. The user can define several MSTIs and can map any VLANs to any MSTI. An Internal Spanning Tree (IST) instance runs inside a MSTP region to define the topology for all VLANs mapped to that common instance. This is what extends the CST but inside a region as opposed to outside of the region. The IST instance is always present in regions of a topology. MSTI may also run inside a region but never extends beyond it. A CST instance is the unique and mandatory instance that connects all 802.1 regions and all the Bridges that do not run 802.1 (i.e., those that run a flat version of STP such as, for example, 802.1D-2004). In fact, the CST instance treats each region as a virtual Bridge. Accordingly, for all practical purposes, the combination of IST and CST yields CIST (i.e., the combined functionality IST and CST).

Spanning tree computation (i.e., roll and state computations) enables each port of a Bridge in a network to be assigned a role (e.g., Root, Master Designated, Alternate, Backup or Disabled) and a state (e.g., Learning, Forwarding, or Discarding). The role and state are assigned in accordance with the state machines described in the MSTP standard (i.e., IEEE 802.1Q 2005 standard). MSTP dictates that " . . . on a boundary port, the Multiple Spanning tree instances roles must follow the Common and Internal Spanning Tree (CIST) role . . . ". CIST and its associated role is defined in the 802.1Q 2005 paragraph 13.13 (Stable Connectivity) as, at a boundary port, frames allocated to the CIST and all MSTIs which are forwarded alike or not forwarded alike. This is because boundary port information assignments are such that if the CIST port information is Root Port the MSTI port information will be Master Port, and if the CIST port information is Designated Port, Alternate Port, Backup Port, or Disabled Port, each MSTI's port information will be the same. Port information is defined herein to include port role information (e.g., a port role) and port state information (e.g., a current state).

A problem discovered in the latest standard 802.1Q 2005 is the following: when some information changes on a boundary port causing a previously Alternate state becoming Root Forwarding, the reciprocal change for MSTI which is Alternate to Master Forwarding does not happen at the same moment as for the CIST. The reason is that the MSTI must wait until a Proposal/Agreement handshake takes place in the Designated Discarding port. In other words, CIST and MSTI states on boundary port can be slightly desynchronized on purpose, to allow taking care of a known 802.1Q 2003 problem of a transient loop on MSTIs. Therefore, while a new CIST Root port may already Forwarding and proceed to a Topology Change (TC) conforming to the states machines, a new Master port may still be discarding and according to the latest disposition document, will wait until the CIST Proposal/Agreement sequence takes place on the formerly CIST Root port, because it is Designated Discarding. Therefore, it should still be necessary for the Bridge to proceed to a new Topology Change as soon as the MSTI Master port becomes Forwarding because the newest CIST Root port and MSTI Master Port are not becoming Forwarding at the same time anymore.

If the Bridge does not proceed to Topology Change right away when the MSTI Master port becomes Forwarding, lack of connection for such MSTI traffic may arise in the Bridge network because no flushing happens at the time a new Master port is forwarding for such MSTI. Therefore, the old information for bridging the traffic remains and may correspond to a path that is not usable anymore. Worst case is a lack of connection for 2 seconds, which is the time needed to send a hello Bridge Protocol Data Unit (BPDU) transporting the TC.

While a situation of a transient loop seems to be addressed in the 802.1Q 2005 standard, the documented solution results in a corresponding situation that is undesirable. More specifically, the flushing of the Source Learning tables used to Bridge the traffic does not occur when the MSTI master port becomes Forwarding. This is because there is currently a test in the Port Transmit state machine that prevents a Master port from sending any BPDU. Undesirably, the action to flush the Source Learning tables used to Bridge the traffic occurs about two seconds later or, worst case, when a corresponding hello BPDU is sent. Therefore, facilitating Topology Change functionality in a manner that overcomes shortcomings associated with conventional approaches for facilitating Topology change when Regional Root information changes would be advantageous, desirable and useful.

SUMMARY OF THE DISCLOSURE

Embodiments of the present invention serve to enhance connectivity performance provided by a Bridge in a Local Area Network (LAN) that is configured with Multiple Spanning Tree Protocol (MSTP). More specifically, embodiments of the present invention significantly reduce the duration of time between a Multiple Spanning Tree Instance (MSTI) Master port on the Bridge transitioning to a Forwarding state and the MSTI Master port issuing a Topology Change Bridge Protocol Data Unit (BPDU) message. In doing so, embodiments of the present invention advantageously overcome one or more shortcomings associated with conventional aspects of implementation of MSTP of a Bridge of a LAN.

In one embodiment of the present invention, a method for providing Topology Change functionality in a Local Area Network (LAN) comprises a plurality of operations. An operation is performed for determining that a Multiple Spanning Tree Instance (MSTI) Master port on a Bridge of a LAN has transitioned to Forwarding state from a corresponding Common Internal Spanning Tree Instance (CSTI) Root port state and an operation is performed for transitioning a Port Transmit state machine of the Bridge from an Idle state to a Transmit state for enabling issuance of a Topology Change (TC) BPDU message from the MSTI Master port. The operation of transitioning the Port Transmit state machine is performed in response to performing the operation of determining that the Multiple Spanning Tree Instance (MSTI) Master port has transitioned to Forwarding state.

In another embodiment of the present invention, a method for providing Topology Change functionality in a Local Area Network (LAN) comprises a plurality of operations. An operation is performed for identifying occurrence of an event on a Bridge of a LAN. The event includes making a Regional Root Information change. An operation is performed for desynchronizing a Multiple Spanning Tree Instance (MSTI) Master port state from a corresponding Common Internal Spanning Tree Instance (CSTI) Root port state on the Bridge in response to identifying occurrence of the event. An operation is performed for determining when the MSTI Master port transitions to Forwarding state from the corresponding CSTI Root port state. An operation is performed for transitioning a Port Transmit state machine of the Bridge from an Idle state to a Transmit state for enabling issuance of a Topology Change (TC) BPDU from the MSTI Master port. An operation of transitioning the Port Transmit state machine is performed in response to the operation for determining when the MSTI Master port has transitioned to Forwarding state. An operation is performed for issuing a Topology Change (TC) BPDU message from the MSTI Master port in response to performing the operation for transitioning the Port Transmit state machine to the Transmit state.

In another embodiment of the present invention, an Open Systems Interconnection (OSI) Layer 2 network apparatus comprises a plurality of operations readable by a data processing device of the Layer 2 network apparatus. Instructions are provided for determining that a Multiple Spanning Tree Instance (MSTI) Master port on a Bridge of a LAN has transitioned to Forwarding state from a corresponding Common Internal Spanning Tree Instance (CSTI) Root port state and instructions are provided for transitioning a Port Transmit state machine of the Bridge from an Idle state to a Transmit state for enabling issuance of a Topology Change (TC) BPDU message from the MSTI Master port. Transitioning the Transmit state machine of the Bridge from the Idle state to the transmit state is performed in response to determining that the Multiple Spanning Tree Instance (MSTI) Master port has transitioned to Forwarding state.

Turning now to specific aspects of the present invention, in at least one embodiment, an operation is performed for issuing a Topology Change (TC) BPDU message from the MSTI Master port in response to transitioning a Port Transmit state machine of the Bridge from an Idle state to a Transmit state.

In at least one embodiment of the present invention, an operation is performed for desynchronizing the Multiple Spanning Tree Instance (MSTI) Master port state from the corresponding Common Internal Spanning Tree Instance (CSTI) Root port state on the Bridge. In at least one embodiment of the present invention, desynchronising the MSTI Master port state is performed prior to determining that the Multiple Spanning Tree Instance (MSTI) Master port has transitioned to Forwarding state.

In at least one embodiment of the present invention, determining that the Multiple Spanning Tree Instance (MSTI) Master port has transitioned to Forwarding state includes determining successful completion of a Proposal Agreement sequence on the MSTI Master port.

In at least one embodiment of the present invention, desynchronising the MSTI Master port state is performed prior to initiating the Proposal Agreement sequence.

In at least one embodiment of the present invention, an operation is performed for issuing a Topology Change (TC) BPDU message from the MSTI Master port in response to transitioning a Port Transmit state machine of the Bridge from an Idle state to a Transmit state.

These and other objects, embodiments, advantages and/or distinctions of the present invention will become readily apparent upon further review of the following specification, associated drawings and appended claims.

DETAILED DESCRIPTION OF THE DRAWING FIGURES

In implementing Multiple Spanning Tree Protocol (MSTP) according to the IEEE 802.1Q 2003 standard, the Multiple Spanning Tree Instances (MSTIs) allow transient loops to occur. Transient loop means that the loop occurs during a brief time, usually the time needed to forward the Spanning Tree information back and forth between 2 or more Bridges. Transient loops are known to occur when boundary port information changes in a Local Area Network (LAN) topology such as, for example, the LAN shown in FIG. 1. While a solution to a transient loop has been presented in the 802.1Q standard, another problem stems from the solution.

The solution discussed above for solving transient loop includes desynchronizing a MSTI Master port state from its corresponding Common Internal Spanning Tree Instance (CSTI) Root port state. More specifically, on a Bridge where an event boundary port roles and states recomputation takes place, a newly MSTI Master port may still be Discarding and, as required by the latest disposition document, will wait until CSTI Proposal/Agreement sequence takes place on the formerly CSTI Root port, which is now designated Discarding. During such waiting, a newly designated CSTI Root port corresponding to the newly designated MSTI Master port may already become designated Forwarding and proceed to a Topology Change conforming to the states machines. Therefore, it is still necessary to proceed to a new Topology Change state as soon as the MSTI Master port becomes designated Forwarding because the newest CSTI Root port and the MSTI Master port do not become designated Forwarding at the same time. If the MSTI Master port does not proceed to Topology Change state immediately after the MSTI Master port becomes designated Forwarding, a lack of connection may arise in the LAN because no flushing happens at the time a new port is forwarding for the MSTI. Therefore, outdated information for bridging network traffic remains and may correspond to a network path that is not usable anymore. Worst case is a lack of connection for approximately 2 seconds, which is the time needed to send a hello BPDU message transporting a CSTI TC BPDU message.

Figure 1:
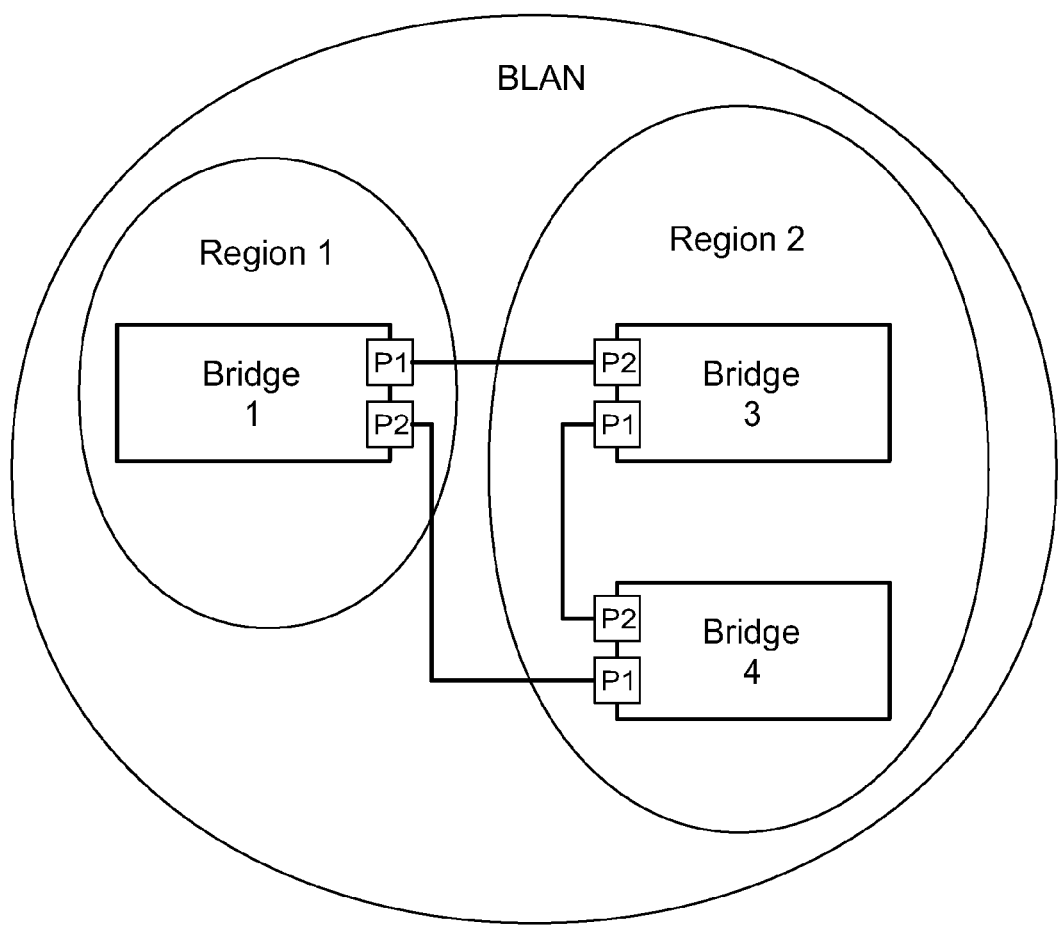
FIG. 1 is a block diagram showing a Local Area Network (LAN) having a plurality of regions and at least one Bridge in each region.

FIG. 1 shows a LAN having a topology in which the Topology Change (TC) problem discussed herein occurs. A skilled person will appreciate that this is one of many possible topologies in which the TC problem discussed herein may occur. Nearly any topology scenario leading to a newly elected MASTER port in any MSTI will often lead to the same TC problem.

The LAN in FIG. 1 has 3 Bridges. Bridge 1 belongs to Region 1 of the LAN. Bridge 3 and Bridge 4 belong to Region 2 of the LAN. Port 1 of Bridge 1 is connected to Port 2 of Bridge 3. Port 1 of Bridge 3 is connected to Port 2 of Bridge 4. Port 1 of Bridge 4 is connected to Port 2 of Bridge 1. Port 2 of Bridge 1, Port 2 of Bridge 3 and Port 1 of Bridge 4 are each a boundary port of the respective Bridge. Two spanning tree instances are configured on each Bridge of the LAN. The first instance is a Common Internal Spanning Tree instance or "CSTI" and the second instance is a Multiple Spanning Tree instance (MSTI). The MSTI is the first instance for MSTP (i.e., MSTI 1)

Turning now to a discussion of a TC problem as discussed herein occurring on a Bridge of the LAN, an event allowed per standard which is changing the External Port Path cost from default value (as specified in the 802.1s standard) to a minimum possible value (as specified in the 802.1s standard) occurs on Port 1 of Bridge 4. Following occurrence of the event, Port 1 of Bridge 4 for CSTI, which is the boundary port for Bridge 4, transitions from the role of Alternate to that of Root Forwarding. Port 1 of Bridge 4 for MSTI 1, which is the boundary port for Bride 4, transitions from the role of Alternate to that of Master Discarding as synced variable is not set on the port 2. Therefore, allSynced function is not set either, according to the latest 802.1Q 2005 standard. Immediately following Port 1 of Bridge 4 for CSTI transitioning from the role of Alternate to that of Root Forwarding, the Bridge 4 CIST root port 1 sends a TC BPDU message related to the CSTI. Bridge 4 MSTI Master Port 1 waits for a Proposal Agreement sequence on Bridge 4 CIST port 2 to take place before it can be transitioned to designated Forwarding. However, when such transition on Bridge 4 MSTI Master Port 1 takes place, Bridge 4 MSTI Master Port 1 won't send any TC BPDU message before the Hello Timer expires because of the conventional configuration of the Port Transmit state machine.

Desynchronizing the MSTI Master port state from its corresponding CSTI Root port state generally addresses the problem of a transient loop. However, flushing of the Source Learning tables used to Bridge traffic never happens when the MSTI Master port becomes Forwarding because there is currently a test in the Port Transmit state machine that prevents a Master port from sending any BPDU message. The action to flush does not occur until about a maximum of two seconds later, worse case, when a Hello BPDU message is sent, which leads to the TC problem discussed herein.

In accordance with the present invention, the TC problem is addressed by allowing any MSTI to also send BPDU messages without the need for such test. At the current time, such BPDU message functionality in the Port Transmit State machine is precluded by MSTP. The present invention advantageously modifies the Port Transmit state machine for providing such functionality.

Two approaches for such modification are disclosed herein. Per the present invention, the first exemplary approach is to also allow sending a TC BPDU message via each MSTI when each MSTI Master port becomes Forwarding. Another possible exemplary approach is to not allow the first TC BPDU message to be sent via CIST when the Root port becomes Forwarding (unless there is no MSTI configured on that port) and wait until all MSTI have transitioned into Master Forward state before sending one single corresponding TC BPDU message.

Discussed now is a specific implementation of such a solution to TC BPDU messaging in accordance with the present invention. It should be understood that there are multiple approaches to modifying state machines for addressing TC BPDU messaging in accordance with the present invention. In view of the disclosures made herein, a skilled person will contemplate other approaches for modifying state machines to address TC BPDU messaging in accordance with the present invention.

In order to transition from the IDLE state to the TRANSMIT_RSTP state in a Port Transmit state machine, testing of the variable or function that informs if a port is Master port when newInfoMsti is assessed must be avoided. Avoiding such testing allows for the Master port to send a TC BPDU message immediately upon a Master port becoming designated Forwarding. One example of pseudo-code for facilitating such testing in accordance with current disposition document 802.1Q 2005:

sendRSTP && (newInfo || (newInfoMsti && !mstiMasterPort)) && (txCount < txholdCount) && (hellowhen !=0).

In one embodiment, modification to this test for allowing TC BPDU messaging functionally in accordance with the present invention results in the following:

sendRSTP && (newInfo || newInfoMsti) && (txCount < txholdCount) && (hellowhen !=0).

It is disclosed herein that this pseudo-code is presented herein only as one example of a possible solution in accordance with the present invention. Terminology, variables names, functions names, and/or the states machines may change in any future document. Thus, specific implementation of the preset invention is at least partially dependent on specific aspects of a given MSTP standard.

Figure 2:
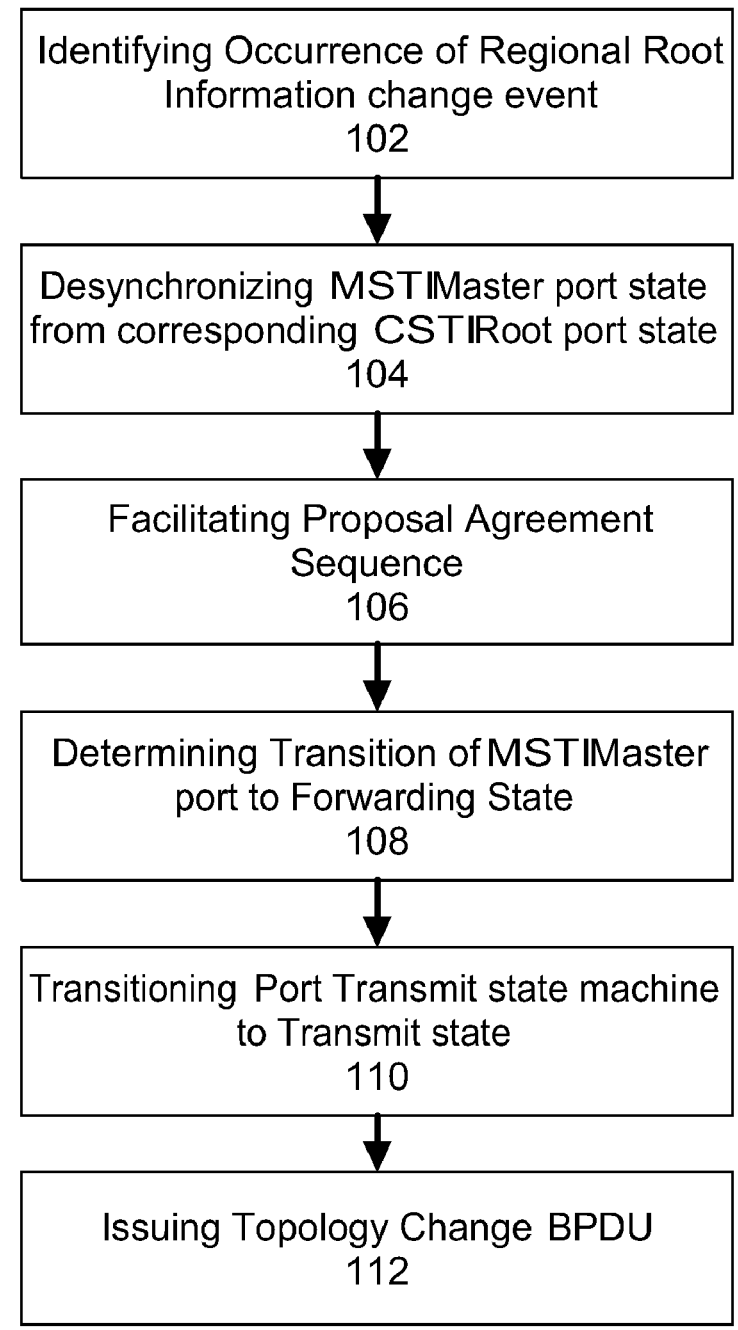
FIG. 2 is flow diagram showing an embodiment of a method for providing Topology Change functionality in a LAN in accordance with the present invention.

FIG. 2 shows a method for providing TC functionality in a LAN (e.g., the LAN of FIG. 1) in accordance with the present invention, which is referred to herein as the method 100. The method 100 begins with an operation 102 for identifying occurrence of an event on a Bridge of the LAN that requires making a boundary port information change. In response to identifying occurrence of the event, an operation 104 is performed for desynchronizing a MSTI Master port state from a corresponding CSTI Root port state on the Bridge. Thereafter, an operation 106 is performed for determining when the MSTI Master port transitions to Forwarding state from the corresponding CSTI Root port state. In one embodiment, determining when the MSTI Master port transitions to Forwarding state preferably, but not necessarily, includes determining successful completion of a Proposal Agreement sequence on the MSTI Master port. In response to determining when the MSTI Master port has transitioned to Forwarding state, an operation 108 is performed for transitioning a Port Transmit state machine of the Bridge from an Idle state to a Transmit state. Such transitioning of the Port Transmit state machine enables issuance of a Topology Change (TC) BPDU from the MSTI Master port. An operation 112 is performed for issuing a TC BPDU message from the MSTI Master port in response to transitioning the Port Transmit state machine to the Transmit state. As is disclosed herein, TC functionality in accordance with the present invention is readily implementable and provides for a standard MSTP implementation allowing sub-500 ms reconvergence or even less.

In accordance with the present invention, an OSI Layer 2 network apparatus is configured for providing TC functionality as disclosed herein. To this end, such an OSI Layer 2 network apparatus is configured with instructions for carrying out such TC functionality. In one embodiment, instructions are configured for carrying out the method 100 disclosed herein. Such instructions may be provided on an OSI Layer 2 network apparatus (e.g., a Bridge) for enabling such apparatus to carry out TC functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for providing Topology Change functionality in a Bridged Local Area Network (LAN), comprising:
    determining that a Multiple Spanning Tree Instance (MSTI) Master port on a Bridge of a LAN has transitioned to Forwarding state from a corresponding Common Internal Spanning Tree Instance (CSTI) Root port state;
    transitioning a Port Transmit state machine of the Bridge from an Idle state to a Transmit state for enabling issuance of a Topology Change (TC) BPDU message from the MSTI Master port, wherein said transitioning is performed in response to performing said determining;
    desynchronizing the Multiple Spanning Tree Instance (MSTI) Master port state from the corresponding Common Internal Spanning Tree Instance (CSTI) Root port state on the Bridge, wherein said desynchronizing is performed prior to performing said determining; and
    issuing a Topology Change (TC) BPDU message from the MSTI Master port in response to performing said transitioning.

2. The method of claim 1 wherein said determining includes determining successful completion of a Proposal Agreement sequence on the MSTI Master port.

3. The method of claim 2,
    wherein said desynchronizing is performed prior to initiating the Proposal Agreement sequence.

4. A method for providing Topology Change functionality in a Local Area Network (LAN), comprising:
    identifying occurrence of an event on a Bridge of a LAN, wherein the event includes making a boundary port information change;
    desynchronizing a Multiple Spanning Tree Instance (MSTI) Master port state from a corresponding Common Internal Spanning Tree Instance (CSTI) Root port state on the Bridge in response to identifying occurrence of the event;
    determining when the MSTI Master port transitions to Forwarding state from the corresponding CSTI Root port state;
    transitioning a Port Transmit state machine of the Bridge from an Idle state to a Transmit state for enabling issuance of a Topology Change (TC) BPDU from the MSTI Master port, wherein said transitioning of the Port Transmit state machine is performed in response to performing said determining; and
    issuing a Topology Change (TC) BPDU message from the MSTI Master port in response to performing said transitioning.

5. The method of claim 4 wherein said desynchronizing is performed prior to performing said determining.

6. The method of claim 4 wherein said determining includes determining successful completion of a Proposal Agreement sequence on the MSTI Master port.

7. The method of claim 6 wherein said desynchronizing is performed prior to initiating the Proposal Agreement sequence.

8. An Open Systems Interconnection (OSI) Layer 2 network apparatus, comprising:
    instructions for determining that a Multiple Spanning Tree Instance (MSTI) Master port on a Bridge of a LAN has transitioned to Forwarding state from a corresponding Common Internal Spanning Tree Instance (CSTI) Root port state;
    instructions for transitioning a Port Transmit state machine of the Bridge from an Idle state to a Transmit state for enabling issuance of a Topology Change (TC) BPDU message from the MSTI Master port, wherein said transitioning is performed in response to performing said determining;
    instructions for desynchronizing the Multiple Spanning Tree Instance (MSTI) Master port state from the corresponding Common Internal Spanning Tree Instance (CSTI) Root port state on the Bridge, wherein said desynchronizing is performed prior to performing said determining; and
    instructions for issuing a Topology Change (TC) BPDU message from the MSTI Master port in response to performing said transitioning.

9. The apparatus of claim 8 wherein said instructions for determining include instructions for determining successful completion of a Proposal Agreement sequence on the MSTI Master port.

10. The apparatus of claim 9,
    wherein said desynchronizing is performed prior to initiating the Proposal Agreement sequence.

* * * * *

UNITED STATES PATENT AND TRADEMARK OFFICE
CERTIFICATE OF CORRECTION

PATENT NO. : 7,609,655 B2
APPLICATION NO. : 11/463718
DATED : October 27, 2009
INVENTOR(S) : Laurence Rose It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this

Twelfth Day of October, 2010

David J. Kappos
*Director of the United States Patent and Trademark Office*